United States Patent [19]

Reichenberger

[11] Patent Number: 4,834,074
[45] Date of Patent: May 30, 1989

[54] SAFETY SYSTEM FOR A SHOCK WAVE GENERATOR

[75] Inventor: Helmut Reichenberger, Eckental, Fed. Rep. of Germany

[73] Assignee: Siemens Aktiengesellschaft, Berlin and Munich, Fed. Rep. of Germany

[21] Appl. No.: 110,064

[22] Filed: Oct. 15, 1987

Related U.S. Application Data

[63] Continuation of Ser. No. 821,094, Jan. 21, 1986, abandoned.

[30] Foreign Application Priority Data

Feb. 4, 1985 [DE] Fed. Rep. of Germany ....... 3503688

[51] Int. Cl.$^4$ ............................................. A61B 17/22
[52] U.S. Cl. .................................. 128/24 A; 128/328
[58] Field of Search ............................. 128/328, 24 A

[56] References Cited

U.S. PATENT DOCUMENTS

| | | | |
|---|---|---|---|
| 2,937,640 | 5/1960 | Bastir | 128/24 |
| 3,489,241 | 1/1970 | Stienberg | 181/5 |
| 4,390,026 | 6/1983 | Christman | 128/660 |

FOREIGN PATENT DOCUMENTS

| | | |
|---|---|---|
| 0082508 | 6/1983 | European Pat. Off. |
| 2722252 | 11/1978 | Fed. Rep. of Germany . |
| 3118502 | 11/1982 | Fed. Rep. of Germany . |
| 3312014 | 10/1984 | Fed. Rep. of Germany . |
| 2427652 | 5/1979 | France . |
| 2468527 | 8/1981 | France . |
| 1003985 | 9/1965 | United Kingdom . |
| 1496137 | 12/1977 | United Kingdom . |

Primary Examiner—Michael H. Thaler
Attorney, Agent, or Firm—Mark H. Jay

[57] ABSTRACT

The shock wave generator preferably includes a primary coil with preceding secondary diaphragm. The primary coil is acted upon with a current pulse by discharge of a capacitor via a spark gap, whereby a shock wave is triggered. The time response of the discharge current is determined with a measuring resistor and supplied to the first input of a first comparator. To the second input of the comparator a reference value is supplied. If the difference between the measured value and the reference value exceeds a given value, an alarm signal is given, which actuates e.g. an alarm signaling device and/or blocks the triggering of additional shock waves. The pressure response of the shock wave at given points of the path is determined by means of pressure pickups and another comparator. An excessive difference from an expected pressure reference value leads to an alarm signal. An advantage of the safety measures is that a deterioration of the electrical contacts of the spark gap, short circuits in the primary coil, deformations of the secondary diaphragm, gas accumulations in the shock wave generator and other irregularities can be recognized in good time.

8 Claims, 1 Drawing Sheet

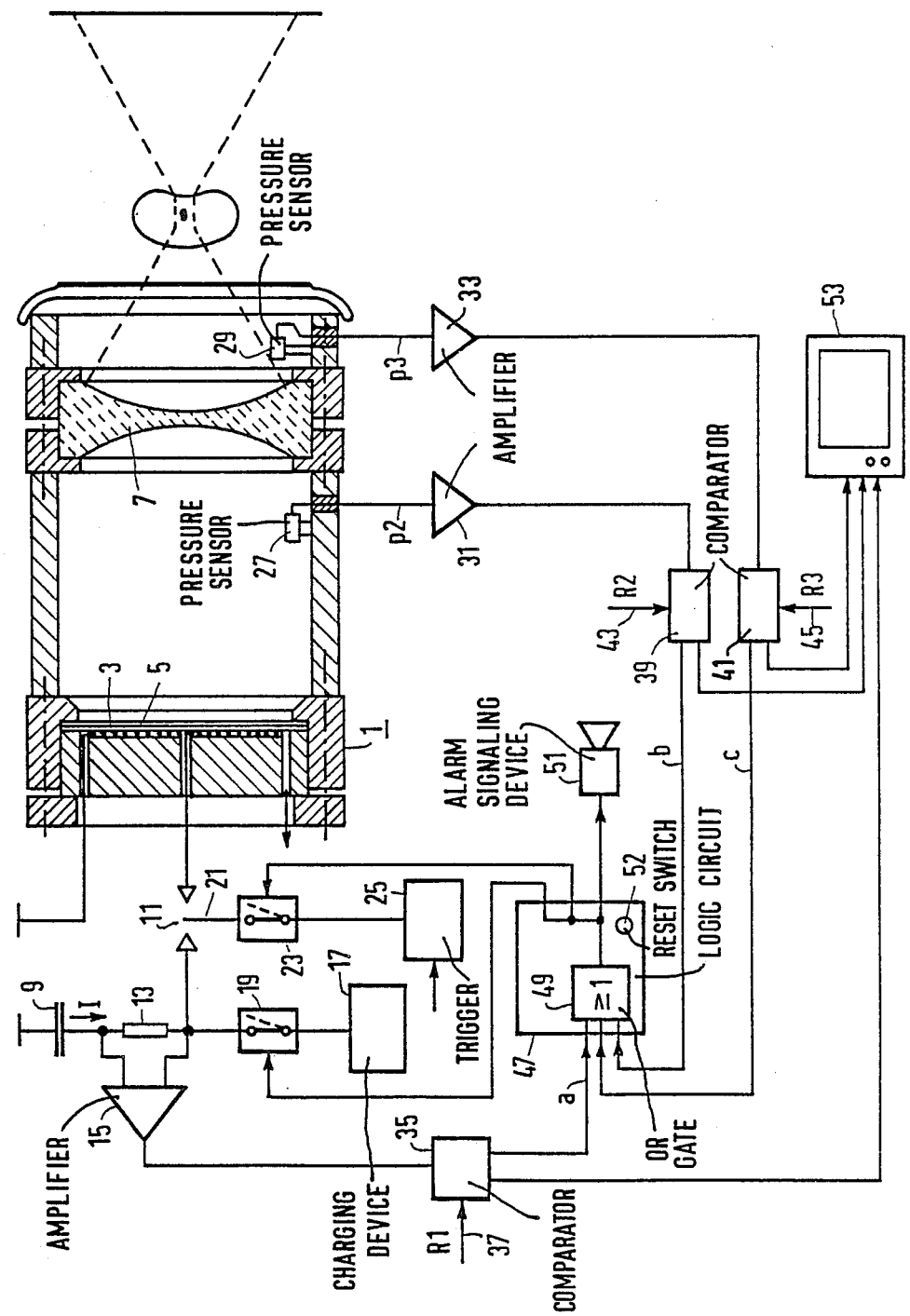

SAFETY SYSTEM FOR A SHOCK WAVE GENERATOR

CROSS-REFERENCE TO RELATED APPLICATION

This is a continuation of Ser. No. 821,094 filed Jan. 21, 1986, abandoned.

BACKGROUND OF THE INVENTION

The invention relates to a shock wave generator for the generation of shock waves for contactless fragmentation of concrements (e.g. kidney stones) in the body of a living being.

Such a shock wave generator (a tube) is described in German Offenlegungsschrift No. 33 12 014. There a concave coil is provided which together with a diaphragm generates a focused shock wave. The shock waves are triggered when a capacitor is discharged into the coil via a spark gap. However, no measures are described for continuously monitoring the functionality of the shock wave generator.

A shock-wave tube of the type considered herein is also described in commonly owned U.S. patent application Ser. No. 634,021, filed 07/24/1984 and entitled "Apparatus for the Contact-Free Desintegration of Calculi", the disclosure of which application is incorporated herein by reference.

Such monitoring would be advantageous especially for guarding the patient from possible harm due to an alteration of the field geometry or an excessively high pressure shock wave. It would further be advantageous to detect defects as they occurred to prevent further damage.

One object of the present invention is to provide a shock wave generator in which alteration of its characteristics is recognized at an early time.

SUMMARY OF THE INVENTION

In accordance with the invention, there is provided a shock wave tube and a safety system operating in a manner that operating parameters of the shock wave tube are continuously monitored and operation of the shock wave tube is inhibited when a fault is detected.

In a first preferred embodiment, the safety system comprises a comparator. This compares (a) a measured value derived from the time response of the electric current upon discharge of the capacitor with (b) a given reference value, and sends out an alarm signal in dependence on the comparison.

In a second preferred embodiment, the safety system comprises a pressure pickup arranged along the path of the shock waves and a comparator. The comparator compares a measured value derived from the time response of the pressure with a given reference value and send out an alarm signal for activation of a safety measure in dependence on the comparison.

By means of the first preferred embodiment it can be determined, for example, whether the electric contacts of the spark gap are in good condition. If there is an electric coil, the coil can be monitored for short circuits. It is also possible to monitor penetration of moisture into the space between the primary coil and a diaphragm positioned in front of it. Deformations of the diaphragm or other faults can be recognized in good time. Thus costly consequent damage can be avoided.

The second preferred embodiment offers the further advantage that wear on a connected focusing system and accumulation of gas along the path of the shock waves can be recognized. If the shock wave generator is an upright shock wave tube and gas collects under a focusing lens that may be present, the gas can be detected from the pressure values.

BRIEF DESCRIPTION OF THE DRAWING

The single exemplary and non-limiting FIGURE shows a schematic block diagram of the invention.

DETAILED DESCRIPTION OF PREFERRED EMBODIMENTS

A shock wave generator 1 is a known shock wave tube. It includes a flat primary coil 3, a secondary diaphragm 5, and a lens which serves as a focusing system 7. A capacitor 9 is discharged into the primary coil 3 via a spark gap 11 when the spark gap 11 is triggered. The discharge occurs through a measuring resistor 13 across which a first amplifier 15 is connected. The discharge current is designated by I. The capacitor 9 is recharged via a charging device 17. The connection between the capacitor 9 and the charging device 17 can be interrupted by means of a first switch 19. The spark gap 11 has an auxiliary electrode 21 which is connected to a trigger 25 via a second switch 23. Trigger 25 permits a triggering of a single shock wave, a sequence of shock waves, or a heart or respiration-triggered generation of shock waves. The triggering can be interrupted by means of the second switch 23. Along the sound path of the shock wave are located a first pressure pickup 27 and a second pressure pickup 29 which are arranged respectively in front of and behind the focusing system 7. The pressure pickups 27, 29 are preferably off to the side of the shock wave tube 1 so that they do not excessively influence the propagation of the shock wave. Suitable pressure pickups 27, 29 are preferably piezoelectric polymer sensors, such as PVDF, or ceramic. Piezoresistive diaphragm sensors may also be used. The pressure pickups 27, 29 are connected to a second amplifier 31 and a third amplifier 33, respectively, and furnish pressure data p2, p3.

The output of the first amplifier 15 is connected to the input of a first comparator 35. The first comparator 35 has a second input 37, through which a reference response R1 of the anticipated current I during a capacitor discharge is entered. This anticipated reference response R1 is compared with the actual response after each capacitor discharge. For the comparison, use is made of characteristic variables of the discharge current I, such as the amplitude, period, or attenuation of the current. If the compared values differ by more than a given difference, an alarm signal a is produced at the output of the first comparator 35.

In a similar manner, the second and third amplifiers 31, 33 are connected with a second and third comparator 39, 41 respectively. The second and third comparators 39, 31 have a second input 43, 45 by way of which reference responses R2, R3 of the expected pressure of the shock wave are put in. These reference responses R2, R3 are expected at the point of the path where the first and second pressure pickups 27, 29 are positioned.

These expected reference responses R2, R3 are compared with the actual response after each shock wave activation. For comparison, use is made of characteristic variables of the pressure response p2, p3, such as amplitude, rise time, or delay time. If the compared values differ by more than a given difference, an alarm signal b is produced at the output of the second comparator 39, or respectively an alarm signal c at the third comparator 41.

The outputs of the three comparators 35, 39, 41 are connected to the input of a logic circuit 47. The logic circuit 47 contains for example an OR gate 49, which through the forwarded signal (control signal) opens the first switch 19 and the second switch 23 when an input signal is present. This inhibits subsequent recharging of capacitor 9 and ignition of the spark gap 11 before the next shock wave is triggered. The shock wave generator, therefore, has been taken out of operation. Also criteria can be introduced according to which only the second switch 23 is opened in case of malfunction. The logic circuit 47 is also connected to an alarm signaling device 51 which alerts the operator optically and/or acoustically to the existence of an irregular operating state. At the logic circuit 47, a display means (not shown) indicates which safety circuit has caused the alarm a, b or c. The normal operating state can be restored by actuation of a reset switch 52, which may be for example a pushbutton.

The outputs of the comparators 35, 39, 41 are connected to a viewer 53, e.g. a storage oscilloscope, on which, in case of alarm, the last measured response of the discharge current I and/or of the pressure wave p2, p3 is displayed.

The operation of the invention may be illustrated with reference to an exemplary fault, namely a reduction of the insulation between two turns of the primary coil 3. Damage to the insulation between coil turns entails a reduction of the coil inductance. Consequently the discharge current I will have a shortened period.

Via the measuring resistor 13 and the first amplifier 15, a representation of the charging current I is supplied to the first input of the first comparator 35. The first comparator 35 establishes by direct comparison with the reference value R1, that is, with the period of a discharge current through an undamaged coil 3, that the last current response was anomalous. Thereupon the first comparator 35 sends an alarm signal a to the logic circuit 47, whereupon the second switch 23 is opened, so that no further capacitor discharge can take place. Also, switch 23 blocks any further trigger signals reaching the trigger electrode. At the same time the alarm signaling device 51 is activated, to alert the operator of the shock wave generator 1 to this anomalous operating state. The operator may then display the last measured discharge curve I on the viewer 53. He sees from it that a shortening of the period has occurred, from which he can conclude that the fault must lie in the LC circuit of the shock wave generator 1. Therefore he need not extend his fault search to the spark gap 11, because a variation of the electrode spacing, electrode burnoff or altered ignition conditions affect mainly the amplitude of the current discharge I and not its duration.

By monitoring the circuit there can be detected primarily a deterioration of the electrical contacts of the spark gap 11 as well as a deformation of the secondary diaphragm 5, short circuits in the primary coil 3, and penetration of moisture into the space between primary coil 3 and secondary diaphragm 5. The monitoring of the pressure wave response by means of the pressure pickups 27, 29 offers the possibility of detecting short circuits in the primary coil 3, deformation of the secondary diaphragm 5, wear of the focusing device 7, and possible gas accumulation at the focusing device 7 or before the secondary diaphragm 5.

Those skilled in the art will understand that changes can be made in the preferred embodiments here described, and that these embodiments can be used for other purposes. Such changes and uses are within the scope of the invention, which is limited only by the claims which follow.

I claim:

1. A system for use in devices which produce shock waves for destroying concretions in the body of a living patient, comprising:
   a shock wave generator for producing shock waves;
   a capacitor for storing electrical energy to be discharged into the shock wave generator to cause the shock wave generator to produce a shock wave;
   means for charging the capacitor;
   triggerable switch means for connecting the capacitor to the shock wave generator;
   means for triggering the switch means;
   a resistor connected in series with the capacitor and the shock wave generator;
   means for measuring the electric current through the resistor during discharge of the capacitor into the shock wave generator;
   means for comparing an actual characteristic of the measured electric current with a predetermined desired characteristic thereof, the means for comparing being connected to the means for measuring and producing a signal upon a comparison which indicates a deviation of the actual characteristic of the electric current from the predetermined characteristic corresponding to an operating fault; and
   means for disabling the means for triggering, said disabling means being connected to the means for triggering as well as to the means for comparing, the means for disabling being adapted to disable the means for triggering upon receipt of the signal of the means for comparing indicating a deviation, thereby inhibiting further operation of the shock wave generator.

2. The system of claim 1, further comprising:
   means for generating an alarm signal upon receipt of the signal of the means for comparing indicating a deviation, the means for generating being connected to the means for comparing.

3. The system of claim 1, further comprising:
   a switch connecting the capacitor to the means for charging;
   means for throwing the switch; and
   means for deactivating the means for throwing, said deactivating means being connected to the means for throwing as well as to the means for comparing, the means for deactivating being adapted to deactivate the means for throwing upon receipt of the signal of the means for comparing indicating a deviation, thereby preventing the means for charging from charging the capacitor.

4. A system for use in devices which produce shock waves for destroying concretions in the body of a living patient, comprising:
   a shock wave generator for producing shock waves along a propagation path;
   a capacitor for storing electrical energy to be discharged into the shock wave generator to cause the shock wave generator to produce a shock wave;
   means for charging the capacitor;
   triggerable switch means for connecting the capacitor to the shock wave generator;
   means for triggering the switch means;

pressure pick-up means disposed in the propagation path of the shock waves produced by the shock wave generator;

means for measuring the pressure picked up by the pressure pick-up means during production of a shock wave;

means for comparing an actual characteristic of the measured pressure with a predetermined desired characteristic thereof, the means for comparing being connected to the means for measuring and producing a signal upon a comparison which indicates a deviation of the actual characteristic of the pressure from predetermined characteristic corresponding to an operating fault; and means for disabling the means for triggering, said disabling means being connected to the means for triggering as well as to the means for comparing, the means for disabling being adapted to disable the means for triggering upon receipt of the signal of the means for comparing indicating a deviation, thereby inhibiting further operation of the shock wave generator.

5. The system of claim 4, wherein the shock wave generator has a means for focussing the shock waves, said focussing means being disposed in the propagation path, wherein the pressure pick-up means comprises two separate pressure pick-ups, one being disposed forwardly of and one rearwardly of the means for focussing, a means for measuring as well as a means for comparing is provided for each pressure pick-up, and wherein the means for disabling is adapted to disable the means for triggering upon receipt of a signal indicating a deviation from at least one means for comparing.

6. The system of claim 4, further comprising:
means for generating an alarm signal upon receipt of the signal of the means for comparing indicating a deviation, the means for generating being connected to the means for comparing.

7. The system of claim 4, further comprising:
a switch for connecting the capacitor to the means for charging;
means for throwing the switch; and
means for deactuating the means for activating, said deactivating means being connected to the means for throwing as well as to the means for comparing, the means for deactivating being adapted to deactivate the means for throwing upon receipt of the signal of the means for comparing indicating a deviation, thereby preventing the means for charging from charging the capacitor.

8. A system for use in devices which produce shock waves for destroying concretions in the body of a living patient, comprising:
a shock wave generator for producing shock waves along a propagation path;
a capacitor for storing electrical energy to be discharged into the shock wave generator to cause the shock wave generator to produce a shock wave;
means for charging the capacitor;
triggerable switch means for connecting the capacitor to the shock wave generator;
means for triggering the switch means;
a resistor connected in series with the capacitor and the shock wave generator;
means for measuring the electric current through the resistor during discharge of the capacitor into the shock wave generator;
means for comparing an actual characteristic of the measured electric current with a predetermined desired characteristic thereof, the means for comparing being connected to the means for measuring and producing a signal upon a comparison which indicates a deviation of the actual characteristic of the electric current from the predetermined characteristic corresponding to an operating fault;
a pressure pick-up means disposed in the propagation path of the shock waves produced by the shock wave generator;
means for measuring the pressure picked up by the pressure pick-up means during production of a shock wave;
means for comparing an actual characteristic of the measured pressure with a predetermined desired characteristic thereof, the means for comparing being connected to the means for measuring and producing a signal upon a comparison which indicated a deviation of the actual characteristic of the pressure from predetermined characteristic corresponding to an operating fault; and
means for disabling the means for triggering, said disabling means being connected to the means for triggering as well as to both means for comparing, the means for disabling being adapted to disable the means for triggering upon receipt of the signal of either means for comparing indicating a deviation, thereby inhibiting further operation of the shock wave generator.

* * * * *